United States Patent [19]

Tanaka et al.

[11] Patent Number: 4,905,105

[45] Date of Patent: Feb. 27, 1990

[54] AUTOMATIC STOP MECHANISM FOR TAPE RECORDER

[75] Inventors: Shinsaku Tanaka, Tokyo; Kunio Kido, Wako, both of Japan

[73] Assignee: Tanashin Denki Co., Ltd., Tokyo, Japan

[21] Appl. No.: 103,068

[22] Filed: Sep. 30, 1987

[30] Foreign Application Priority Data

Mar. 29, 1985 [JP] Japan .................................. 60-65287

[51] Int. Cl.⁴ ........................ G11B 15/02; G11B 15/44
[52] U.S. Cl. ................................................. 360/74.2
[58] Field of Search ..................... 360/74.2, 74.1, 96.4, 360/96.3, 93, 96.1, 137

[56] References Cited

U.S. PATENT DOCUMENTS

| 4,238,808 | 12/1980 | Tomita | 360/74.2 |
| 4,495,534 | 1/1985 | Kurafuji | 360/74.2 |

FOREIGN PATENT DOCUMENTS

| 54-125008 | 9/1979 | Japan | 360/74.2 |
| 55-142439 | 11/1980 | Japan | 360/74.2 |
| 60-76046 | 4/1985 | Japan | 360/74.2 |
| 61-224160 | 10/1986 | Japan | 360/74.2 |
| 61-224161 | 10/1986 | Japan | 360/74.2 |
| 2045507 | 10/1980 | United Kingdom . | |
| 2077481 | 12/1981 | United Kingdom . | |
| 2116353 | 9/1983 | United Kingdom . | |

Primary Examiner—John M. Wolff
Attorney, Agent, or Firm—Wegner & Bretschneider

[57] ABSTRACT

An automatic stop mechanism for a tape recorder is described. When a magnetic tape has been wound up fully on a reel, slipping takes place between a gear and reel shaft so that the reel shaft stops. As a consequence, a contact portion of a cam follower is caused to separate from a cam surface and a cam is brought into contact with the contact portion. Since the fulcrum of the cam follower is fixed, a turnable lever is caused to turn clockwise so that a gear is separated form the gear. By the turning motion of the turnable lever, its bent end portion presses a lug of a lock member from the right, thereby shifting the lock member leftwards. A head mounting plate is hence released from its engagement with the lock member and is allowed to return to its non-operated position, whereby a magnetic head is allowed to return to its stop position.

3 Claims, 7 Drawing Sheets

AUTOMATIC STOP MECHANISM FOR TAPE RECORDER

BACKGROUND OF THE INVENTION (1) Field of the Invention

This invention relates to an automatic stop mechanism for a tape recorder, in which in the playback, fast feeding or rewinding mode, a playback, fast feeding or rewinding control member is allowed to return automatically to its non-operated position (i.e., home position) when a magnetic tape has been fully wound up.

(2) Description of the Prior Art

As automatic stop mechanisms for tape recorders, there have heretofore been known those detecting electrically each end of a tape to energize a solenoid so that a control member such as playback, fast feeding or rewinding control member is allowed to return from its operated position (e.g., pressed position) to its non-operated position; those making use of a rotary force of a flywheel or the like to cause such a control member to return to its non-operated position; etc.

Automatic stop mechanisms in each of which each end of a tape is electrically detected to stop the associated tape recorder automatically by means of a solenoid have complex structures due to the incorporation of solenoids and are also disadvantageous in reducing the dimensions of the associated tape recorders.

Turning next to automatic stop mechanisms making use of the rotary force of a flywheel to reverse the running direction of a tape, they generally have such as structure that a pin is provided upright from a portion of the flywheel and a lock member holding a playback, fast feeding or rewinding control member at its operated position is kicked. This structure is thus accompanied by such drawbacks that the balance of the flywheel may be impaired and since the tension of the tape becomes higher temporarily at the beginning of each operation, this increased tension may be detected to cause a false operation. In conventional mechanisms of this type, a detection member adapted for detection of the tension of a tape is interlocked with the advancing and retreating displacement of the associated magnetic head and is allowed to contact with the tape only when the magnetic head has advanced and is maintained in contact with the tape. They are hence accompanied by such an inconvenience that the tape recorder cannot be automatically stopped in the fast feeding and rewinding mode.

SUMMARY OF THE INVENTION

With the foregoing in view, the present invention has as its principal object the provision of an automatic stop mechanism for a tape recorder, which mechanism can automatically stop the tape recorder without need for accessory parts such as solenoids and hence facilitates the size reduction of the tape recorder, is free from adverse effects to the balance of flywheels and false operations, and moreover, can perform a stopping operation automatically upon full take-up of a magnetic tape even in an operation mode such as fast feeding or rewinding mode.

In one aspect of this invention, there is hence provided an automatic stop mechanism for a tape recorder, comprising:

- a rotation transmitting member for transmitting a rotary force of a capstan to a reel shaft via a friction mechanism;
- an eccentric circular cam surface provided eccentrically about a rotary shaft of the rotation transmitting member, and an engagement portion provided with the rotation transmitting member;
- a reel-shaft stop detecting means for detecting each stop of the reel shaft, said means having a cam follower portion and a contact portion and adapted to receive a rotary force of the reel shaft while the reel shaft is being rotated, thereby to maintain the cam follower portion in sliding contact with the circular cam surface and hence to avoid engagement between the contact portion and the engagement portion, but when the reel shaft stops and the cam follower portion remains at a position apart from the circular cam surface, said engagement portion being brought into contact with the contact portion so as to displace the rotation transmitting member to a non-engagement position where the rotation transmitting member is maintained apart from the reel shaft;
- a control member displaceable back and forth between a non-operated position and an operated position, said control member being biased toward the non-operated position normally but at the operated position, maintaining the capstan in a rotated state; and
- a lock member for holding the control member at the operated position but upon displacement of the rotation transmitting member to the non-engagement position, releasing the control member responsive to the displacement of the rotation transmitting member, thereby to allow the control member to return to the non-operated position.

In the above construction, the lock member does not release the control member as long as the reel shaft is in rotation. As soon as the reel shaft stops, the lock member serves to release the control member. Accessory parts such as solenoids are therefore not required, thereby facilitating the size reduction of a tape recorder.

Furthermore, the automatic stop mechanism of this invention is free from such dangers that the balance of rotation of the flywheels may be deleteriously affected and false operations may take place at start or the like.

The automatic stop mechanism of this invention is operated upon detection of stopping of the reel shaft irrespective of the position of the magnetic head. It is therefore free from any false operation even when the tension of a tape becomes high temporarily at start. In any operation mode, i.e., in any one of the playback mode, recording mode, fast feeding mode, rewinding mode and the like, the automatic stop mechanism of this invention can therefore stop the tape recorder whenever the tape has been fully wound up.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

First of all, the first embodiment of this invention will be described with reference to FIG. 1.

Figure 4:
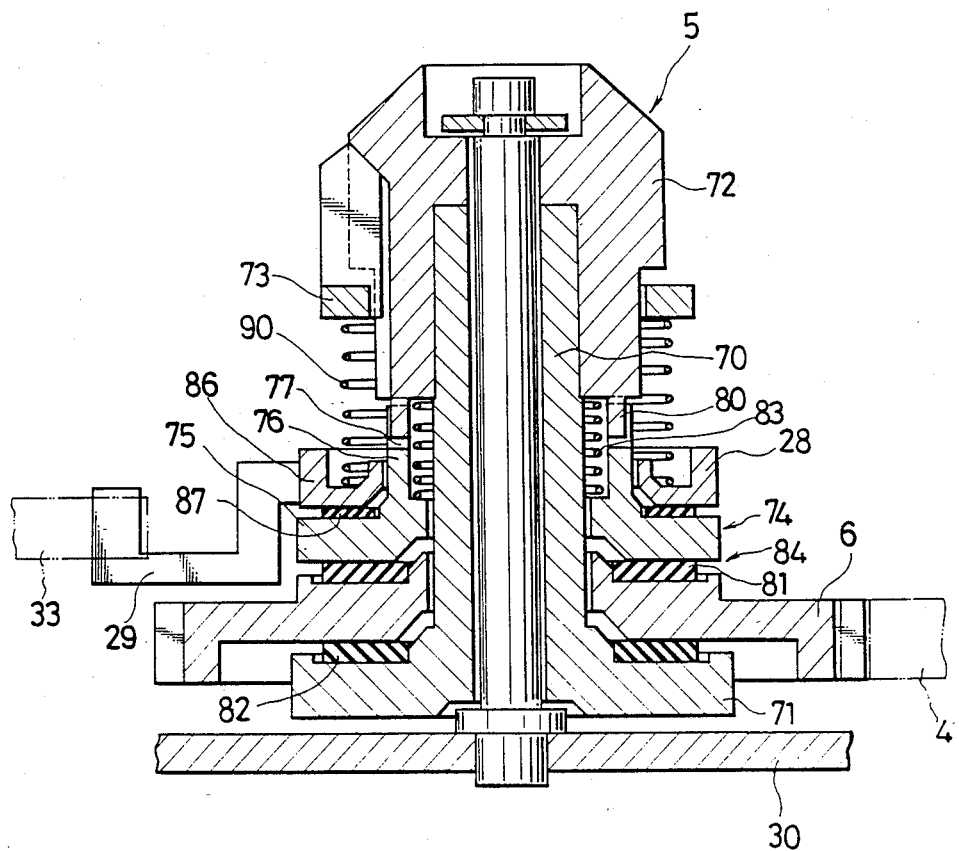
FIG. 4 is a detailed cross-sectional view of a friction mechanism, which can be used commonly in the above embodiments of this invention for detecting each reel stop and for transmitting a rotary force.

A capstan 1 is driven by an unillustrated motor. The rotation of the capstan 1 is transmitted, via a small diameter gear 2 provided coaxially with the capstan 1 and a combination of large diameter gear 3 and small diameter gear 4 (rotation transmitting member) provided coaxially as unitary members, to a gear 6 provided coaxially with a reel shaft 5. The rotation is transmitted further to the reel shaft 5 by way of such a friction mechanism as shown in FIG. 4 by way of example. The above combination of the large diameter gear 3 and small diameter gear 4 are supported via a shaft 8 on one end of a turnable lever 7 which is turnable about the capstan 1. The turnable lever 7 terminates in a bent end portion 9 at the other end and is normally biased by a tension spring 10 in such a direction that the large diameter gear 3 is brought into meshing engagement with the gear 6.

In the large diameter gear 3, an eccentric circular cam surface 11 is formed around the shaft 8. A cam 12 projects from and in continuation with the shaft 8 at a position where the eccentric circular cam surface has the maximum radius.

Designated as numeral 13 is a pinch roller, which is supported on a bracket 15. The bracket 15 is turnable about a pivot 14 so that the pinch roller 13 can be releasably brought into contact with the capstan 1.

Figure 1:
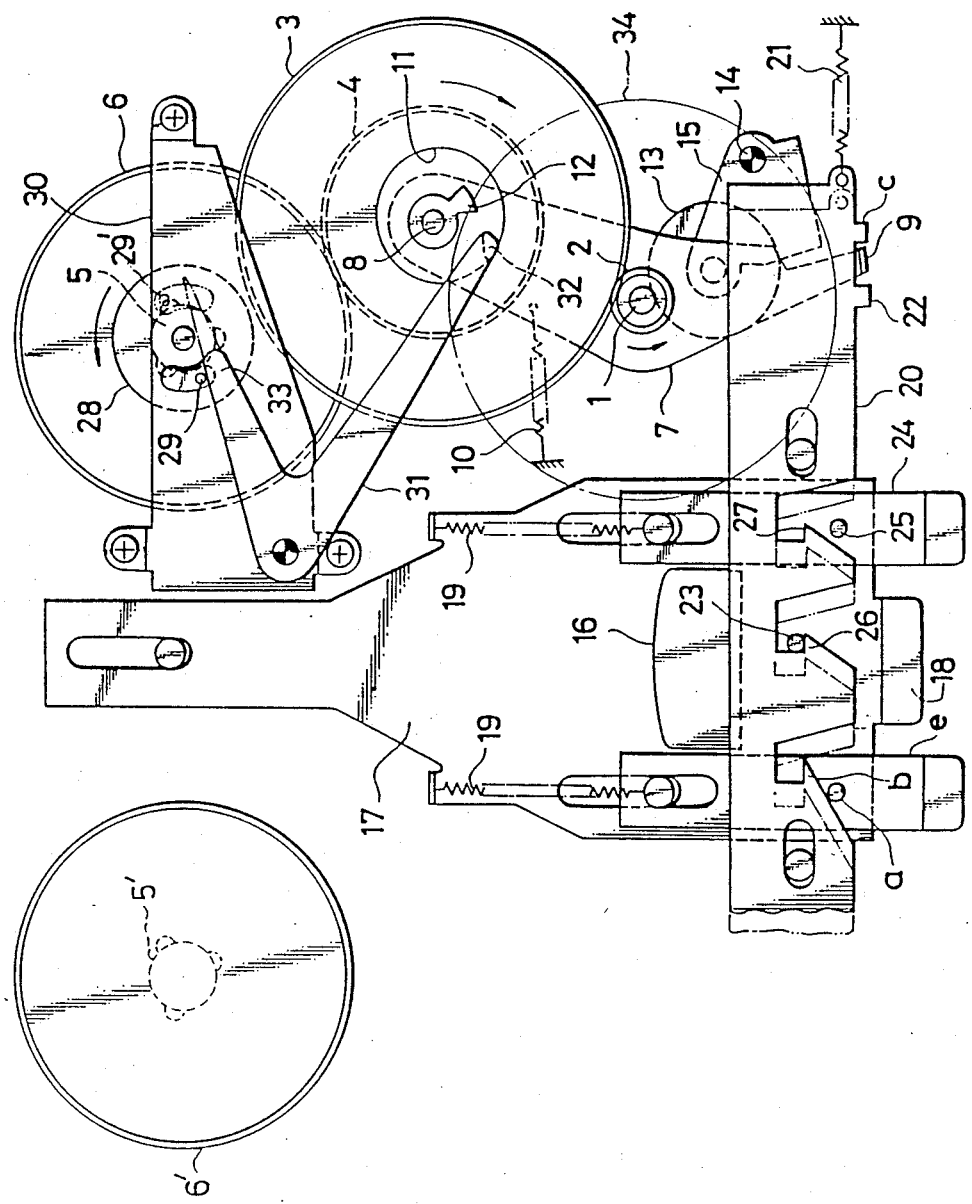
FIG. 1 is a schematic illustration of an automatic stop device according to a first embodiment of this invention.

Numeral 16 indicates a magnetic head, which is mounted on a head mounting plate 17 provided in such a way that the heat mounting plate 17 can be selectively advanced or retreated in the vertical direction as viewed in FIG. 1. Upon advancing or retreating displacement of the head mounting plate 17, the head 16 is brought into contact with a magnetic tape (not illustrated) or separated from the magnetic tape. The head mounting plate 17 is equipped at the rear end thereof (namely, the lower end thereof as viewed in FIG. 1) with a push button 18. The head mounting plate 17 is normally biased in its retreating direction by tension springs 19,19 but when a pushing force is applied to the push button 18, the head mounting plate 17 is caused to advance forward. The head mounting plate 17 and the above-described bracket 15 are interlocked. When the head mounting plate 17 advances and the magnetic head 16 is brought into contact with the magnetic tape, the pinch roller 13 is pressed against the capstan 1. On the other hand, when the head mounting plate 17 retreats and the magnetic head 16 is separated from the magnetic tape, the pinch roller 13 is also separated from the capstan 1. Since this type of interlocking mechanism is conventional, its description is omitted herefrom.

Numeral 20 indicates a plate-like lock member which is slidable horizontally as viewed in FIG. 1. The lock member 20 is normally biased in the rightward direction by a tension spring 21. The lock member 20 is equipped with a lug 22 positioned on the path of movement of the bent end portion 9 of the turnable lever 7. The lock member 20 is also equipped with hook portions 26,27 which correspond respectively to an engagement pin 23 provided upright on the head mounting plate 17 and another engagement pin 25 secured upright on a fast feeding control member 24. When the engagement pin 23 and hook portion 26 or the engagement pin 25 and hook portion 27 are brought into engagement, the head mounting plate 17 or fast feeding control member 24 is held at its operated position. Incidentally, the fast feeding control member 24 is also displaceable in the vertical direction, as viewed in FIG. 1, like the head mounting plate 17. The fast feeding control member 24 is normally biased by an unillustrated tension spring toward its non-operated position.

On a shaft common to the reel shaft 5, there is mounted a rotary member 28 which rotates as a unitary member with reel shaft 5. Pin-like pushing and urging means 29 is fixed on the rotary member 28. Although not illustrated in FIG. 1, a friction mechanism such as that shown in FIG. 4 is interposed between the reel shaft 5 and the large diameter gear 6 so that the large gear 6 is allowed to rotate, for example, even after the reel shaft 5 is stopped. In this case, sliding takes place in the friction mechanism.

Designated at numeral 30 is a fixing plate, on which a cam follower 31 is pivotally mounted.

The cam follower 31 has a contact portion 3 at the farthest position from the fulcrum and also a pressure receiving portion 33 positioned on the path of rotation of the pushing and urging means 29.

Numeral 34 indicates a flywheel mounted fixedly on the capstan 1.

The operation of the automatic stop mechanism according to the first embodiment of this invention will next be described.

In FIG. 1, the head mounting plate 17 has moved forward and the engagement pin 23 has been brought into engagement with the hook portion 26 of the lock member 20, whereby the magnetic head 16 is maintained at an operating position thereof. Further, the pinch roller 13 has been pressed against the capstan 1, so that the rotation of the capstan, the direction of which is indicated by an arrow, is being transmitted to the reel shaft 5 via the gears 2,3,4,6 and the unillustrated friction mechanism and the tape recorder is therefore operated in its playback mode (note the omission of the magnetic tape from the drawing).

At this time, the rotary force of the reel shaft 5 is being transmitted to the cam follower 31 by way of the pushing and urging means 29 and the contact portion 32 of the cam follower 31 is maintained in sliding contact with the cam surface 11. As long as the contact portion 32 is maintained in sliding contact with the cam surface 11 in the above-mentioned manner, the contact portion 32 and cam 12 will not contact to each other.

When the tape has next been wound up fully on the reel, slipping takes place in the friction mechanism interposed between the large diameter gear 6 and reel shaft 5 so that the reel shaft 5 stops. As a consequence, the contact portion 32 which has been maintained in sliding contact with the cam surface 11 is caused to separate from the cam surface 11 at a location closest to the shaft 8 and the cam 12 is hence brought into contact with the contact portion 32. Since the fulcrum of the cam follower 31 is fixed, the turnable lever 7 is then caused to turn clockwise against the spring 10 so that the gear 4 is separated from the large diameter gear 6.

On the other hand, by the turning motion of the turnable lever 7, the bent end portion 9 of the turnable lever 7 presses the lug 22 of the lock member 20 from the right as viewed in FIG. 1, thereby shifting the lock member 20 in the leftward direction. Accordingly, the head mounting plate 17 is released from its engagement with the lock member 20 and is hence allowed to return to the non-operated position by the springs 19, whereby the magnetic head 16 is allowed to return to its stop position.

As a modification of the first embodiment, the pressure receiving part 33 of the cam follower 31 can be extended as indicated by dotted lines. Additional pushing and urging means 29' is also provided fixedly on the rotary member 28 at a position antipodal to the pushing and urging means 29. Further, an additional lug c is provided on the lock bar 20. An engagement pin a is also provided upright on the head mounting plate 17. Its matching hook portion b is formed in the lock bar 20. In the playback or fast feeding mode, the gears 6 and 4 are maintained in meshing engagement while the gears 3 and 2 are also maintained in meshing engagement as shown in FIG. 1. The capstan 1 and pinch roller 13 are brought into engagement only in the playback mode. For performing the rewinding mode, it is necessary to push a rewinding button e so that the engagement pin a and hook portion b are brought into engagement and a reel shaft 5' is rotated to rewind the unillustrated magnetic tape on its associated reel. The degree of displacement of the lock bar 20 at this time is set greater than that in the playback or fast feeding mode. Accordingly, the lug c is brought into contact with the bent end portion 9 so that the lever 7 is caused to turn. This turning angle of the lever 7 is set at a small value sufficient only to disengage the gears 6 and 4 from each other. When the clockwise rotation of the gear 6 stops, the lock bar 20 is shifted to release the locking in the same operation as in the playback or fast feeding mode.

The second embodiment of this invention will next be described with reference to FIG. 2.

In the second embodiment, the turnable lever 7 and lock member 20 of the first embodiment are provided as an integral member, in other words, one end of a lock member 40 is extended to a point close to the reel shaft 5 and the combination of the large diameter gear 3 and small diameter gear 4 are supported on the thus-extended end portion of the lock member 40.

Figure 2:
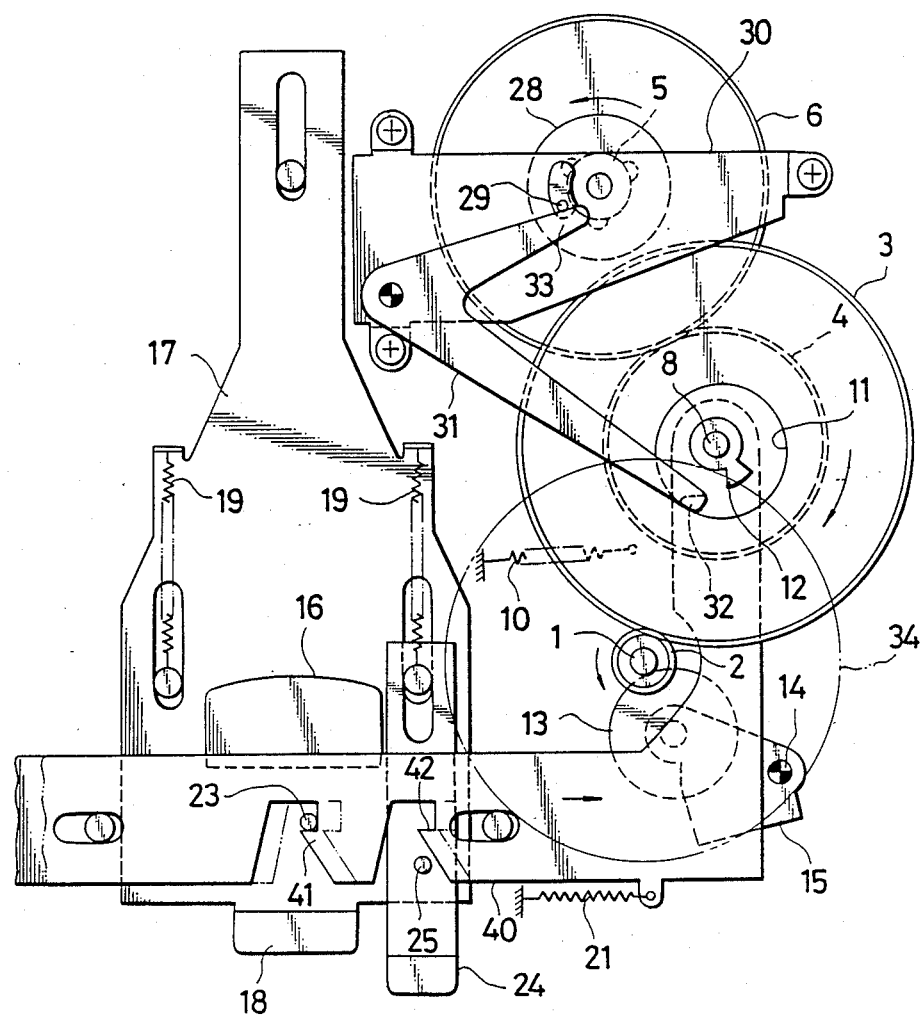
FIG. 2 is a schematic illustration of an automatic stop device according to a second embodiment of this invention.

In the above construction, when the contact portion 32 of the cam follower 31 is brought into contact with the cam 12, the lock member 40 is caused to slide rightward as viewed in FIG. 2 so that the large diameter gear 3 and small diameter gear 4 are separated from the small diameter gear 2 and large diameter gear 6 respectively.

The lock member 40 is normally biased by the tension spring 21 in the leftward direction, namely, in such a direction that the large diameter gear 3 and small diameter gear 4 are brought into meshing engagement with the small diameter gear 2 and large diameter gear 6 respectively. The lock member 40 includes hook portions 41,42 which correspond respectively to the engagement pints 23,25 of the head mounting plate 17 and fast feeding control member 24 respectively. When the engagement pin 23 or 25 is in engagement with the hook portion 41 or 42, they can be disengaged by causing the lock member 40 to slide in a direction opposite to the biased direction. Thus, the head mounting plate 17 or fast feeding control member 24 is allowed to return from the operated position to the non-operated position. The second embodiment of this invention can therefore bring about the same advantages as the first embodiment.

Figure 5:
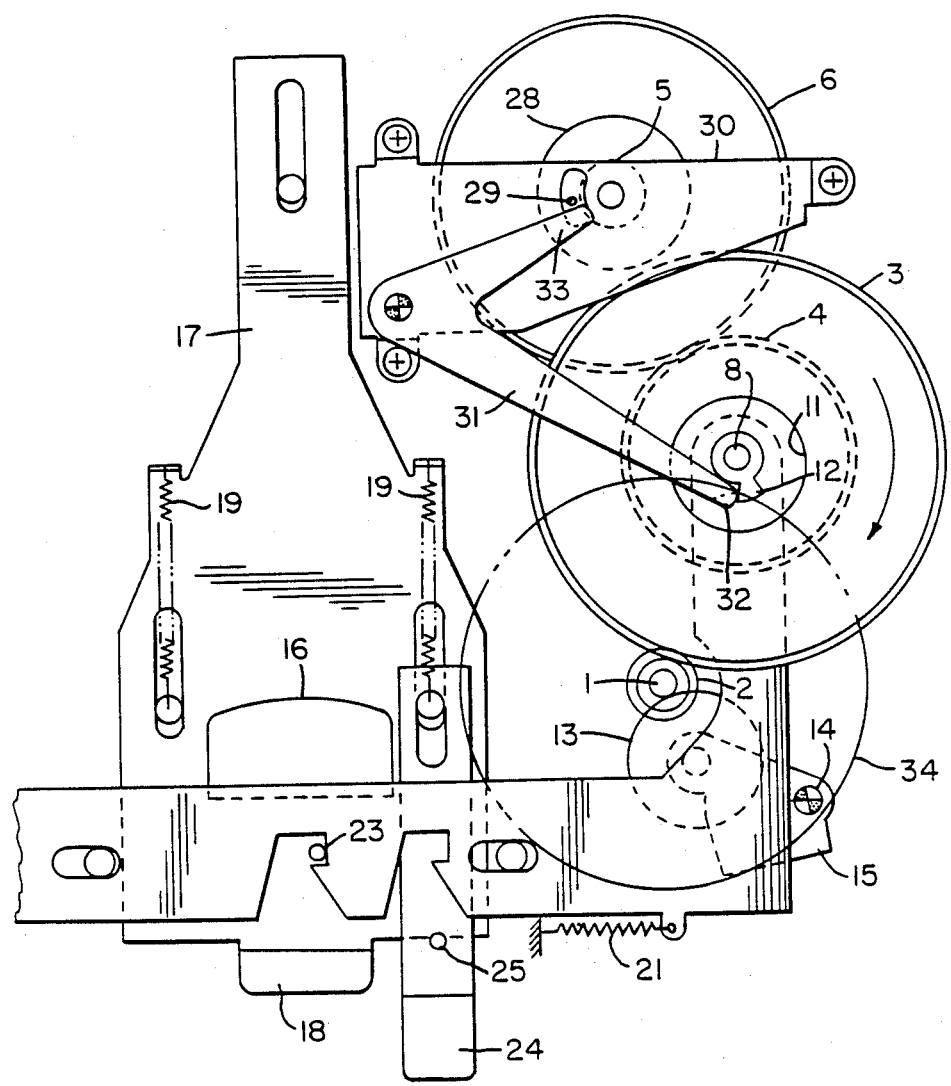
FIGS. 5-7 are schematic illustrations of the automatic stop device according to FIG. 2.
Figure 6:
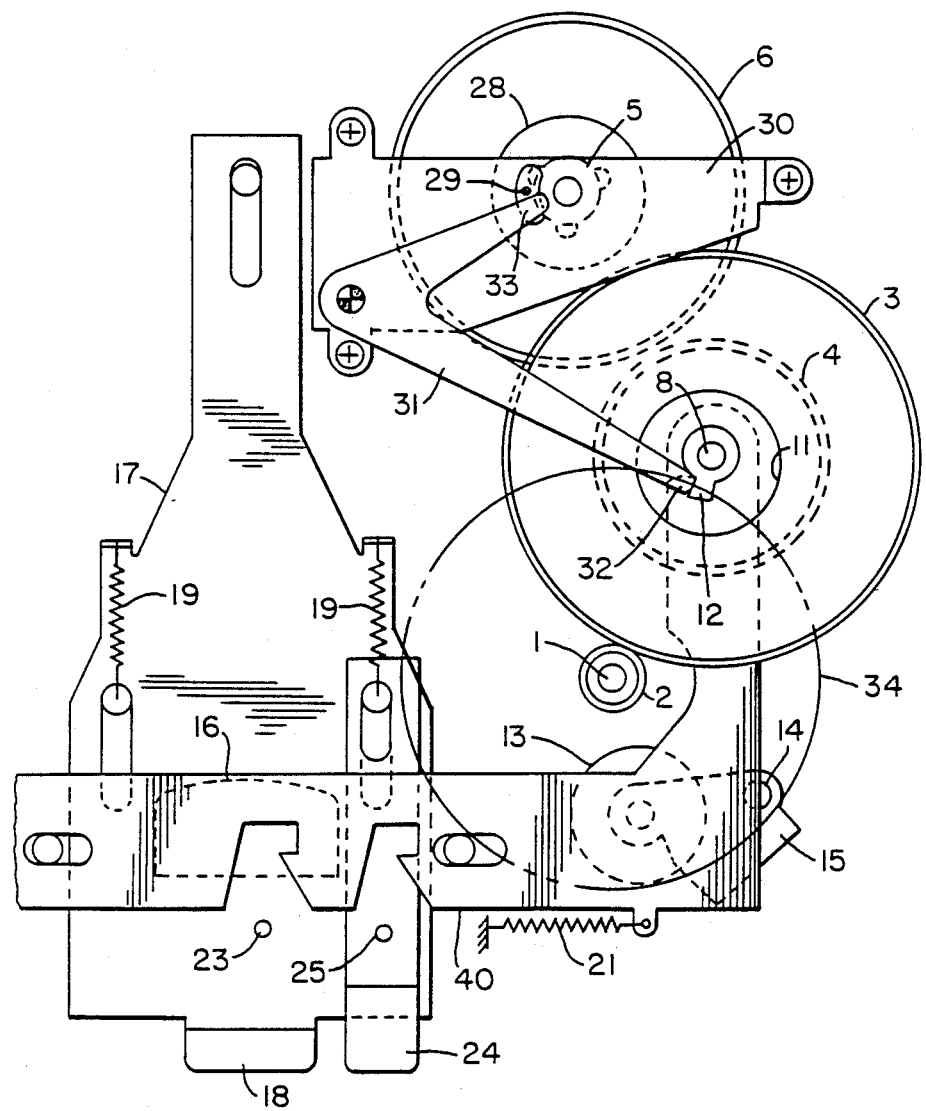
Figure 7:
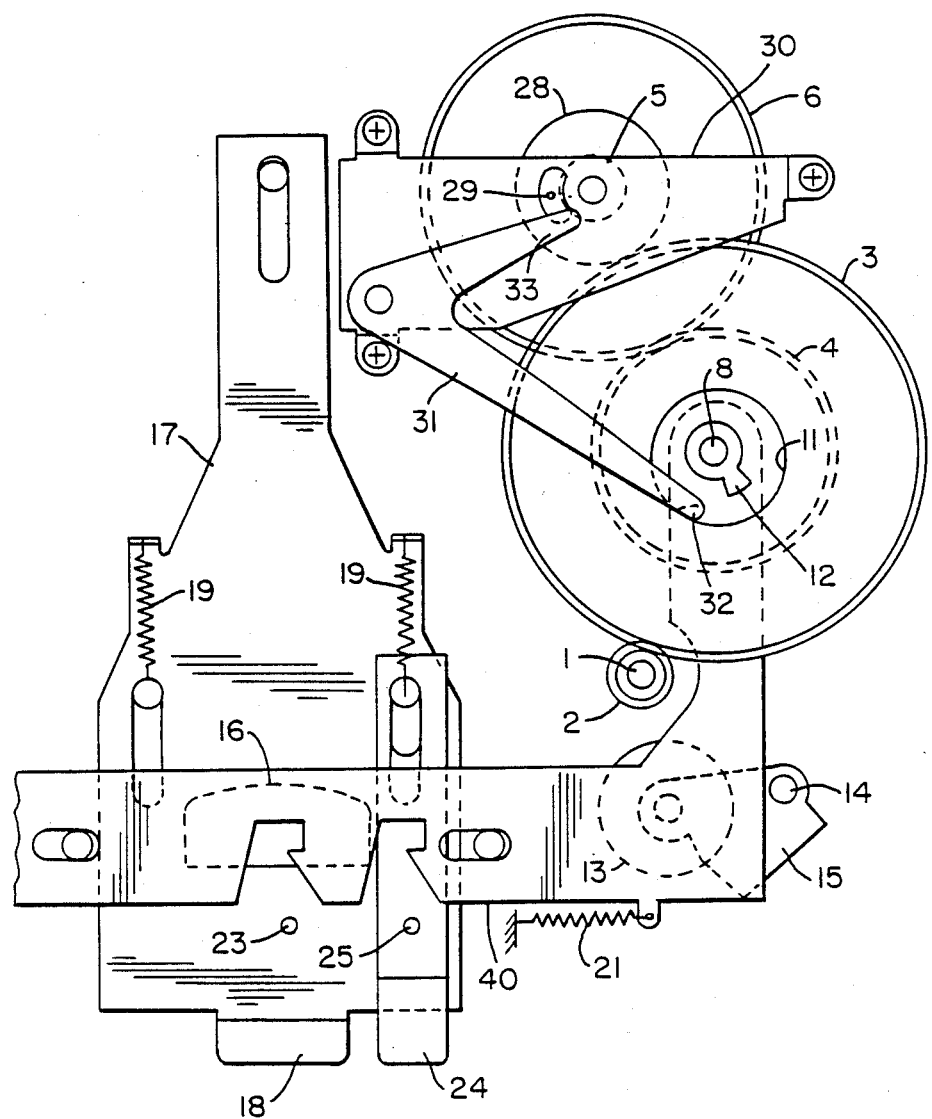

FIGS. 5–7 illustrate the action of the lock member 40. FIG. 5 shows the cam follower portion of the cam follower 31, i.e. the free end of the lower arm of the cam follower, in contact with the cam 12. FIG. 6 shows the lock member 40 moved rightwards (to its unbiased, unlocked position) as a result of the contact of the cam follower portion with the cam 12, whereby the engagement pin 23 has been disengaged from the lock member 40 and the head mounting plate has shifted downwards to its non-operated position. FIG. 7 shows the lock member 40 having returned to its initial position due to the force of tension spring 21.

The third embodiment of this invention will next be described with reference to FIG. 3.

In the third embodiment, the tape recorder can be stopped automatically even in the rewinding mode.

Namely, a take-up reel shaft 5a and a rewinding reel shaft 5b are both provided with rotary members 28a, 28b respectively. The rotary members are in turn provided with pushing and urging means 29a, 29b respectively. On an elongated fixing plate 50 extending from the take-up reel shaft 5a to the rewinding reel shaft 5b, a cam follower 51 is mounted turnably. From the fulcrum of the cam follower 51, a contact portion 52 adapted for sliding contact with the eccentric circular cam surface 11 and pressure receiving portions 53a, 53b, which correspond to the pushing and urging portions 29a, 29b respectively, extend out radially.

Numeral 54 indicates a playback control member, while numerals 55 and 56 indicate a fast feeding control member and rewinding control member respectively. Engagement pints 57,58,59 are provided upright on the individual control members 54,55,56 respectively.

Figure 3:
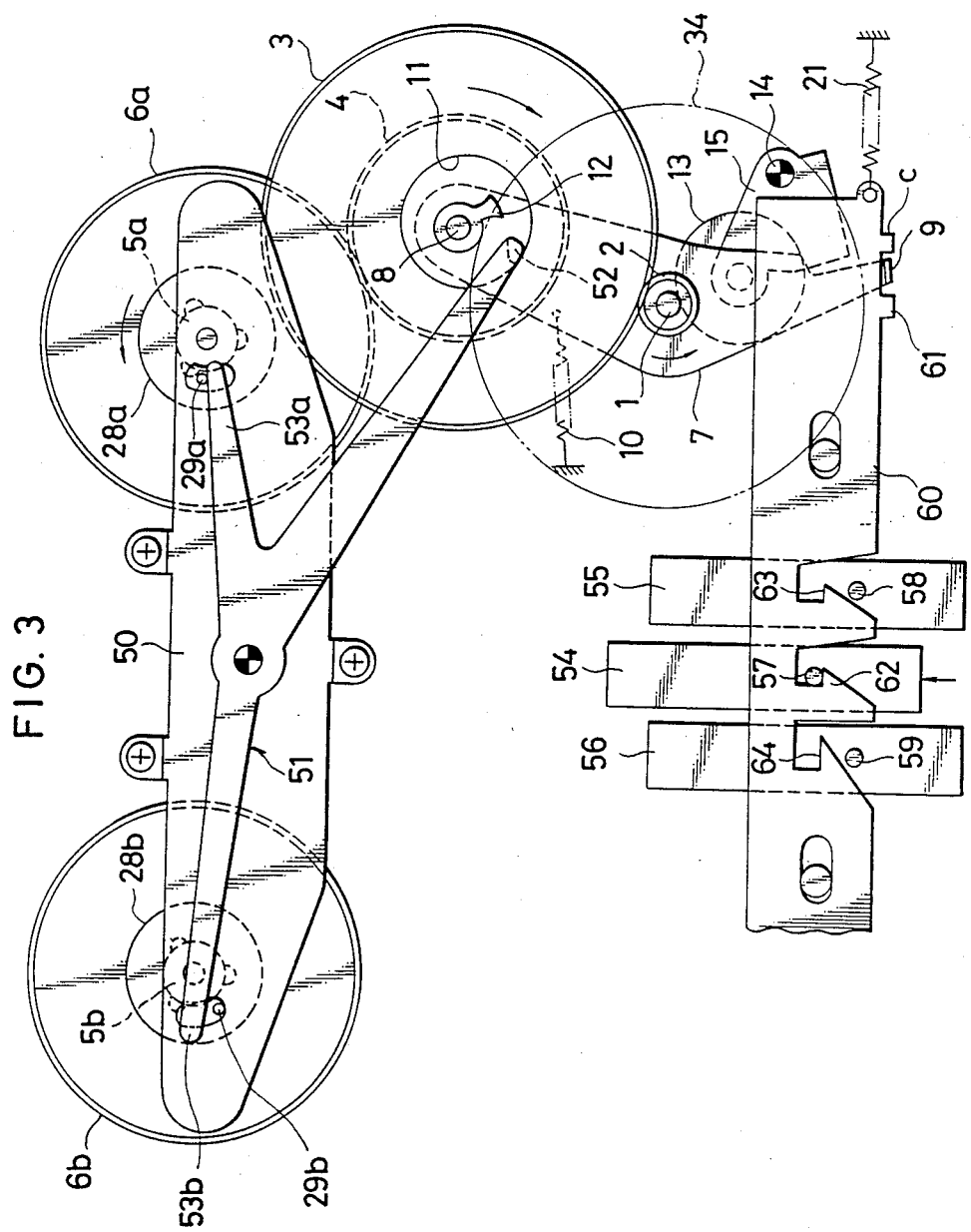
FIG. 3 is a schematic illustration of an automatic stop device according to the third embodiment of this invention.

Designated at numeral 60 is a lock member slidable horizontally as viewed in FIG. 3. The lock member 60 is normally biased in the rightward direction by the tension spring 21. This lock member 60 is provided with a lug 61, which is positioned on the path of movement of the bent end portion 9 of the turnable lever 7, and also with hook portions 62,63,64 which correspond to the engagement pins 57,58,59 respectively. Upon engagement between the engagement pin 57 and hook portion 62, the engagement pin 58 and hook portion 63 or the engagement pin 59 and hook portion 64, the playback control member 54, fast feeding control member 55 or rewinding control member 56 is maintained at its operated position. Each of the control members is provided displaceably up and down as viewed in FIG. 3 but is normally biased by its corresponding unillustrated spring toward its non-operated position.

In the above construction, when the reel shaft 5b has stopped even in the rewinding mode, to say nothing of the playback or fast feeding mode, the contact portion 52 of the cam follower 51 is brought into contact with the cam 12 so that the turnable lever 7 is caused to turn clockwise to slide the lock member 60 in the leftward direction, thereby to stop the tape recorder automatically.

Now, one example of the structure of the above-described friction mechanisms will be described with reference to FIG. 4.

Designated at numeral 30 indicates the fixing plate on which the reel shaft 5 is provided upright.

The reel shaft 5 is provided with a cylindrical member 70 having a flange 71 at a lower end thereof, a cap 72 press-fitted at an upper end of the cylindrical body 70, and a reel driving member 73 mounted for axial movement on an outer periphery of the cap 72. The reel shaft 5 is equipped further with a pressure receiving member 74 located between the cap 72 and the gear 6 which is mounted for rotation around an outer periphery of the cylindrical member 70 above the flange 71. In particular, the pressure receiving member 74 is located above the gear 6 and between a pair of axially opposing surfaces of the cap 72 and the flange 71.

The pressure receiving member 74 includes a flange portion 75 and a cylindrical portion 76 located on the flange portion 75 and is mounted on an outer periphery of the cylindrical member 70 with an engaging portion 77 at an upper end of the cylindrical portion 76 thereof engaged with a complementary engaging portion 80 provided on the cap 72. Here, the engagement between the engaging portions 77 and 80 of the cylindrical portion 76 and the cap 72, respectively, is such that the pressure receiving member 74 may move in the axial direction relative to the cap 72 and may rotate in an integral relationship with the cap 72.

Friction members 81,82 each in the form of a sheet such as a felt sheet are interposed between the flange portion 75 of the pressure receiving member 74 and the gear 6 and between the gear 6 and the flange 71 so that rotation of the gear 6 may be transmitted to the pressure receiving member 74 and the flange 71, respectively.

A second spring member 83 is located between the pressure receiving member 74 and the cap 72 inside the cylindrical portion 76 of the pressure receiving member 74 so that its elastic force may urge the pressure receiving member 74 downwardly toward the gear 6 to provide press contacting forces between the flange portion 75 of the pressure receiving member 74 and the gear 6 and between the gear 6 and the flange 71 with the friction members 81 and 82 interposed therebetween, respectively. The second spring member 83, the friction members 81,82 and the flange portion 75 of the pressure receiving member 74 constitute a friction transmission mechanism 84 for frictionally transmitting a turning force of the gear 6 to the reel shaft 5.

On the other hand, the rotary member 28 is mounted for rotation on an outer periphery of the cylindrical portion 76 above the flange portion 76 of the pressure receiving member 74. The rotary member 28 has a disk portions 86 and a pushing and urging portion 29 extending radially outwardly from the disk portion 86. The pushing and urging portion 29 of the rotary member 28 engages a mechanism (for example, the pressure receiving part 33 of the the cam follower 31 of the automatic stop mechanism) which operates responsive to each rotation or stopping of the reel shaft 5.

A further friction member 87 in the form of a sheet such as a felt sheet is interposed between the disk portion 86 of the rotary member 28 and the flange portion 75 of the pressure receiving member 74, thereby constructing a reel stop detecting friction mechanism, and a first spring member 90 is interposed between an upper end surface of the disk portion 86 and the cap 72. Thus, the elastic force of the first spring member 90 urges the rotary member 28 against the flange portion 75 of the pressure receiving member 74 via the friction member 87. Accordingly, the turning force of the gear 6 is transmitted to the rotary member 28 to produce a pressing force against the pressure receiving part 33 of the cam follower 31, while yielding a slip between the friction member 87 and the disk portion 86 of the rotary member 85.

According to the reel receiving device having such a construction as described above, when a tape reel (not shown) is loaded on the reel driving member 73 and the turning force of the capstan 1 is transmitted to the gear 6 by way of the small diameter gear 4, the gear 6 will be rotated thereby, and such rotation of the gear 6 is transmitted to the reel shaft 5 via the rotation transmitting mechanism 84 t drive the tape reel.

When a tape wound on the tape reel comes to its end subsequently, the rotation of the reel shaft 5 is stopped, yielding a slip between the gear 6 and the friction mechanism 82 and between the gear 6 and the friction member 81. Consequently, the pressing force of the rotary member 28 against the pressure receiving part 33 of the cam follower 31 disappears so that the cam follower 31 will operate to reversely switch the running direction of the tape as will be described subsequently.

In the friction mechanism 84, the press contacting force between the flange portion 75 of the pressure receiving member 74 and the gear 6 with the friction member 81 interposed therebetween and the press contacting force between the gear 6 and the flange 71 with the friction member 82 interposed therebetween are hence derived mainly from the second spring member 83. On the other hand, the elastic force of the first spring member 90 acts to press the reel driving member 73 upwardly and also acts in a direction to enhance the press contacting force exerted in the friction mechanism 84 by the second spring member 83.

Accordingly, the elastic force of the second spring member 83 can be increased to a degree sufficient to assure the operation of the friction mechanism 84. Further, the elastic force of the first spring member 90 can be reduced to facilitate axial movement of the reel driving member 73 because it is merely required to provide, between the rotary member 28 and the pressure receiving member 74, a frictional force sufficient to assure transmission of the pressing force of the rotary member 28 to the pressure receiving part 33 of the cam follower 31 responsive to each rotation or stopping of the reel shaft 5.

It is hence possible to design the degrees of elasticity of the first and second spring members 90,83 independently to their respective optimum values. Since the elastic force of the first spring member 90 can be designed to an optimum value as mentioned above, it is also possible to produce a sufficient pressing force against the rotary member 28 responsive to each rotation or stopping of the reel receiving body 74, and it is accordingly feasible to effectively prevent the automatic stop mechanism from operating in error.

It is to be noted that the structure around the reel shaft is not necessarily limited to such a structure as described above. For example, the reel driving member 73 and the cap 72 may be formed as an integral single body. In this instance, the first spring member 90 will act in two ways, one being to press the rotary member 28 against the pressure receiving member 74 via the friction member 87 and and the other to enhance the press contacting force exerted in the friction mechanism 84 by the second spring member 83.

It is also possible to integrate the cap 72 and the pressure receiving member 74 into a single body while omitting the friction member 81 between the cap 72 and the pressure receiving member 74 and also to extend the second spring member 83 between the cap 72 and the gear 6. This modified structure will provide similar effects.

Having now fully described the invention, it will be apparent to one of ordinary skill in the art that many changes and modifications can be made thereto without departing from the spirit or scope of the invention as set forth herein.

We claim:

1. An automatic stop mechanism for a tape recorder, said mechanism comprising:
    a control member movable between an operated and a non-operated position;
    a lock member operably coupled to said control member for moving said control member between said operated and non-operated positions, said lock member being ordinarily biased in a locked position corresponding to said operated position;
    a rotation transmitting member rotatably supported on said lock member;
    a reel shaft; and
    a means operably coupled between said reel shaft and said rotation transmitting member for transmitting a rotary force to said reel shaft, said means detecting each stop of said reel shaft and, upon detecting a stop, said means causing said rotation transmitting member to move out from a rotary force transmitting path at an operated position of said rotation transmitting member, thus causing said lock member to move to its unlocked position, thus moving said control member to its non-operated position.

2. A mechanism as in claim 1, wherein said lock member includes an extension and said rotation transmitting member is disposed at a distal end of said extension.

3. A mechanism as in claim 1, wherein said lock member is substantially L-shaped having two legs and said rotation transmitting member is disposed at an end of one of said legs.

* * * * *